Dec. 9, 1969        C. M. LENTS        3,482,414
FROZEN CARBONATED BEVERAGE DISPENSING APPARATUS
Filed March 1, 1968        3 Sheets-Sheet 1
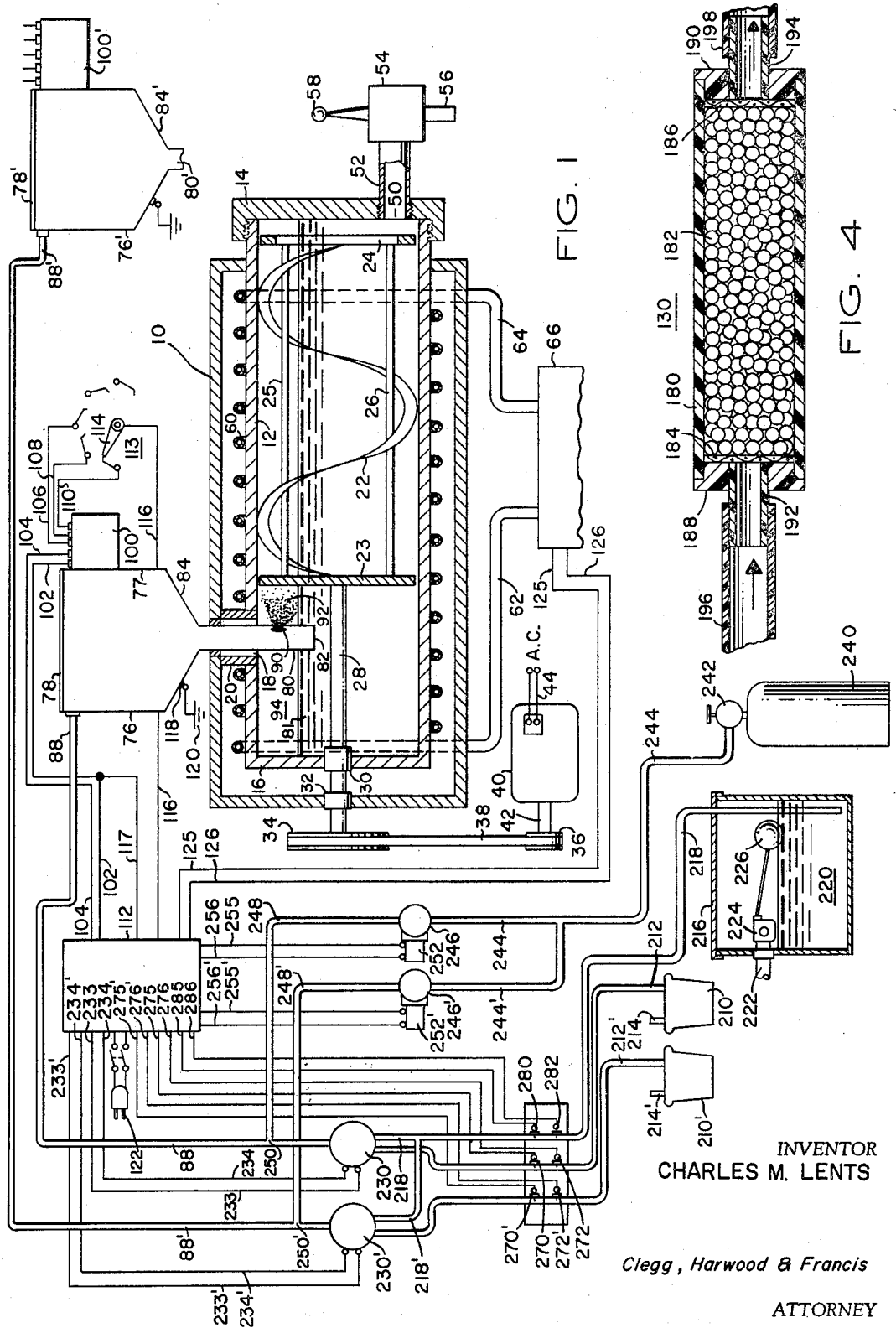
INVENTOR
CHARLES M. LENTS
Clegg, Harwood & Francis
ATTORNEY

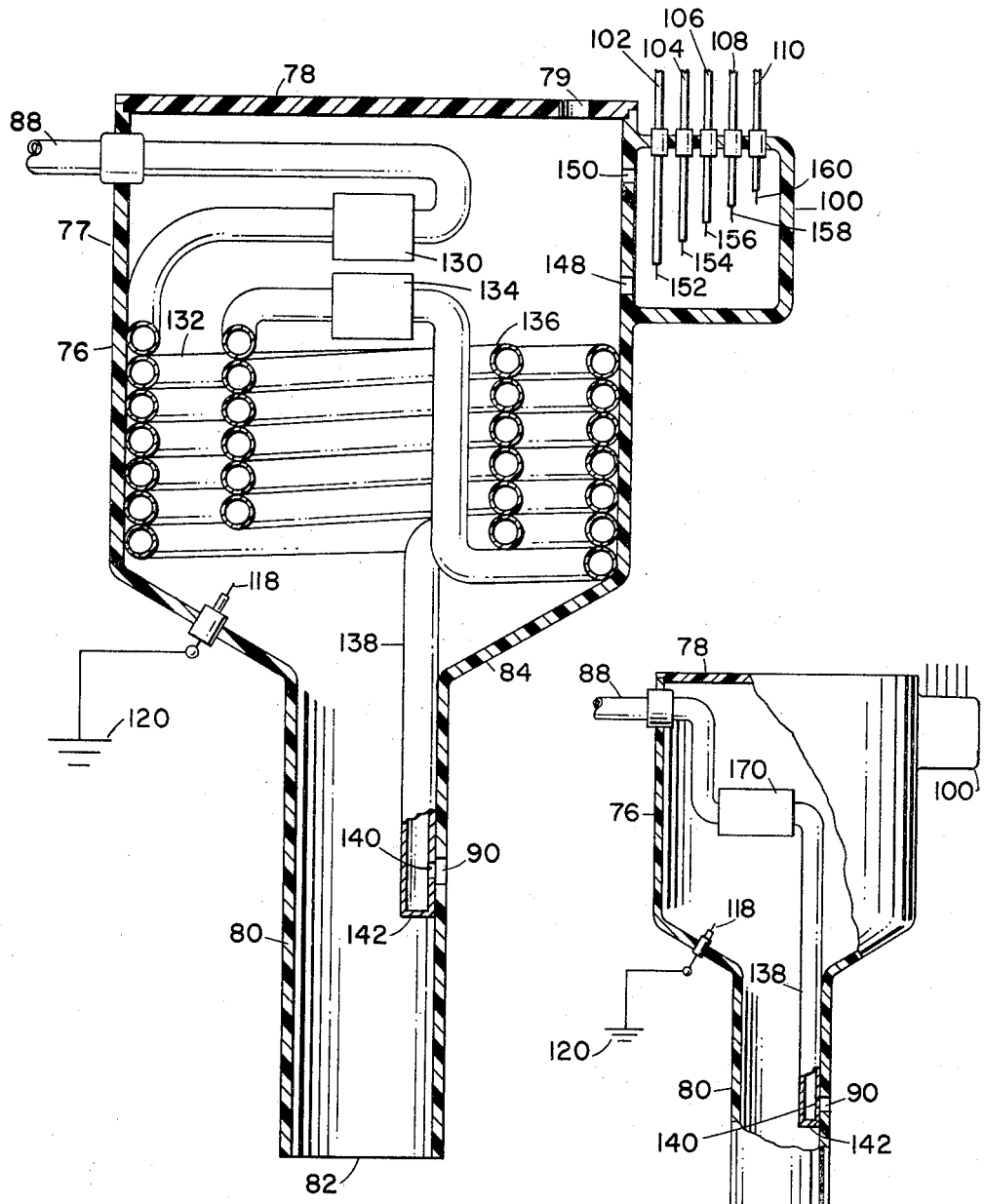

Dec. 9, 1969     C. M. LENTS     3,482,414
FROZEN CARBONATED BEVERAGE DISPENSING APPARATUS
Filed March 1, 1968     3 Sheets-Sheet 3

INVENTOR
CHARLES M. LENTS

Clegg, Harwood & Francis
ATTORNEY

United States Patent Office 3,482,414
Patented Dec. 9, 1969

1

3,482,414
FROZEN CARBONATED BEVERAGE
DISPENSING APPARATUS
Charles M. Lents, Dallas, Tex., assignor of one-half percent to Earl J. Bauer, Dallas, Tex.
Filed Mar. 1, 1968, Ser. No. 709,643
Int. Cl. F25c 1/18, 7/14; F25d 17/00
U.S. Cl. 62—137                                    21 Claims

ABSTRACT OF THE DISCLOSURE

Apparatus is described for freezing and dispensing a carbonated frozen soft drink beverage having a refrigerated mixing chamber, a supply hopper communicating with the mixing chamber and means for controlling a supply of ingredients to the hopper and for controlling refrigeration of the mixing chamber. A control chamber connects with the hopper so that the ingredients seek a level in the control chamber proportional to the amount of ingredients in the mixing chamber. Means disposed within the control chamber monitor the level of the ingredients, and the level of the ingredients within the mixing chamber and the refrigeration of the mixing chamber are controlled responsive to the ingredient level within the control chamber.

---

This application constitutes an improvement over the patent application entitled Process and Apparatus for the Preparation and Dispensing of a Beverage of Earl J. Bauer and Charles M. Lents filed Jan. 31, 1967, Ser. No. 613,021, now U.S. Patent No. 3,403,533, issued Oct. 1, 1968, and the patent application entitled Liquid Supply Control System of Charles M. Lents, filed Sept. 5, 1967, Ser. No. 665,552, now U.S. Patent No. 3,398,550, issued Aug. 27, 1968.

In the first mentioned application, a system is described for freezing and dispensing a carbonated soft drink beverage having a refrigerated mixing chamber, a supply inlet or hopper communicating with the mixing chamber and means for controlling a supply of ingredients to the hopper. This application discloses the basic means for providing a carbonated soft drink variety beverage at atmospheric pressure, and includes means for providing a supply of ingredients to a refrigerated mixing chamber and means for maintaining the ingredient within the refrigeration chamber at substantially atmospheric pressure, although the ingredients within the chamber are frozen prior to dispensing.

The second mentioned application provides improved means for controlling the supply of ingredients to the refrigeration chamber through probe means disposed within the inlet or hopper and additionally provides, in other embodiments thereof, control means for controlling the supply of ingredients to the refrigeration chamber.

The disclosure hereinafter of the present invention constitutes an improvement over the two prior mentioned patent applications especially in the control of the supply of the ingredients forming the frozen beverage and the refrigeration of the mixing chamber within which the ingredients are frozen.

The apparatus of the present invention contributes to the two prior inventions in that improved control means are provided for the control of the supply of ingredients to the mixing chamber and the control of the refrigeration of the mixing chamber. In particular, another control chamber is provided that communicates with the supply inlet or hopper within which means are disposed for controlling the supply of ingredients to the mixing chamber and for controlling the refrigeration of the mixing chamber. The control chamber is essential-

2 ly isolated from the inlet hopper in the sense that the ingredients seek a level within the control chamber that is proportional to the true level within the mixing chamber, whereas the level of ingredients within the hopper itself may be inaccurate and uncontrolled due to freezing and expansion. In other words, the control chamber and the means associated therewith enable a detection of the true level of the ingredients within the mixing chamber so that the control of the supply of the ingredients to the refrigeration chamber can be accurately controlled in addition to the accurate control of the refrigeration of the mixing chamber. The true level within the control chamber indicates, also, the degree to which the mixture is frozen due to expansion upon freezing.

A preferred embodiment of the apparatus of the invention disclosed hereinafter provides a control chamber that communicates with a supply hopper through which ingredients are supplied to the mixing or refrigeration chamber for mixing and freezing the carbonated beverage. A supply chamber communicates with the supply hopper so that the ingredients supplied through the hopper seek a level proportional to the amount of ingredients within the mixing or refrigeration chamber but within which the ingredients are not agitated so that an accurate true level can be detected or monitored. Means are provided within the control chamber for monitoring or detecting, or measuring as the case may be, the level of the ingredients within the control chamber, which level is proportional to the level of ingredients within the mixing or refrigeration chamber, whether in the refrigerated or frozen or liquid state, as the case may be, so that the level of the ingredients within the refrigeration chamber can be controlled. As to the latter, the height of the ingredients within the control chamber has been found to be proportional to the viscosity of the ingredients, being proportional to their degree of refrigeration in the refrigeration chamber and thus adequate and accurate control of the degree of refrigeration of these ingredients can be detected by the level of the ingredients within the control chamber.

Many of the objects, features and advantages of the invention will become readily apparent from the following detailed description thereof when taken in conjunction with the appended claims and the attached drawings wherein like reference numerals are referred to like parts throughout the several figures and in which:

FIGURE 1 is a side elevational view, partly in section, of an apparatus for producing and dispensing carbonated, frozen soft drink beverages, and supply means and control means shown schematically for use therewith;

FIGURE 2 is a side elevational view, in section of the inlet hopper and control chamber employed with the apparatus of FIGURE 1;

FIGURE 3 is a side elevational view, partly broken away, of an alternate embodiment of the inlet hopper of FIGURE 2;

FIGURE 4 is a side elevational view, in section, of a diffuser which may be employed with the apparatus of FIGURE 1.

Figure 5:
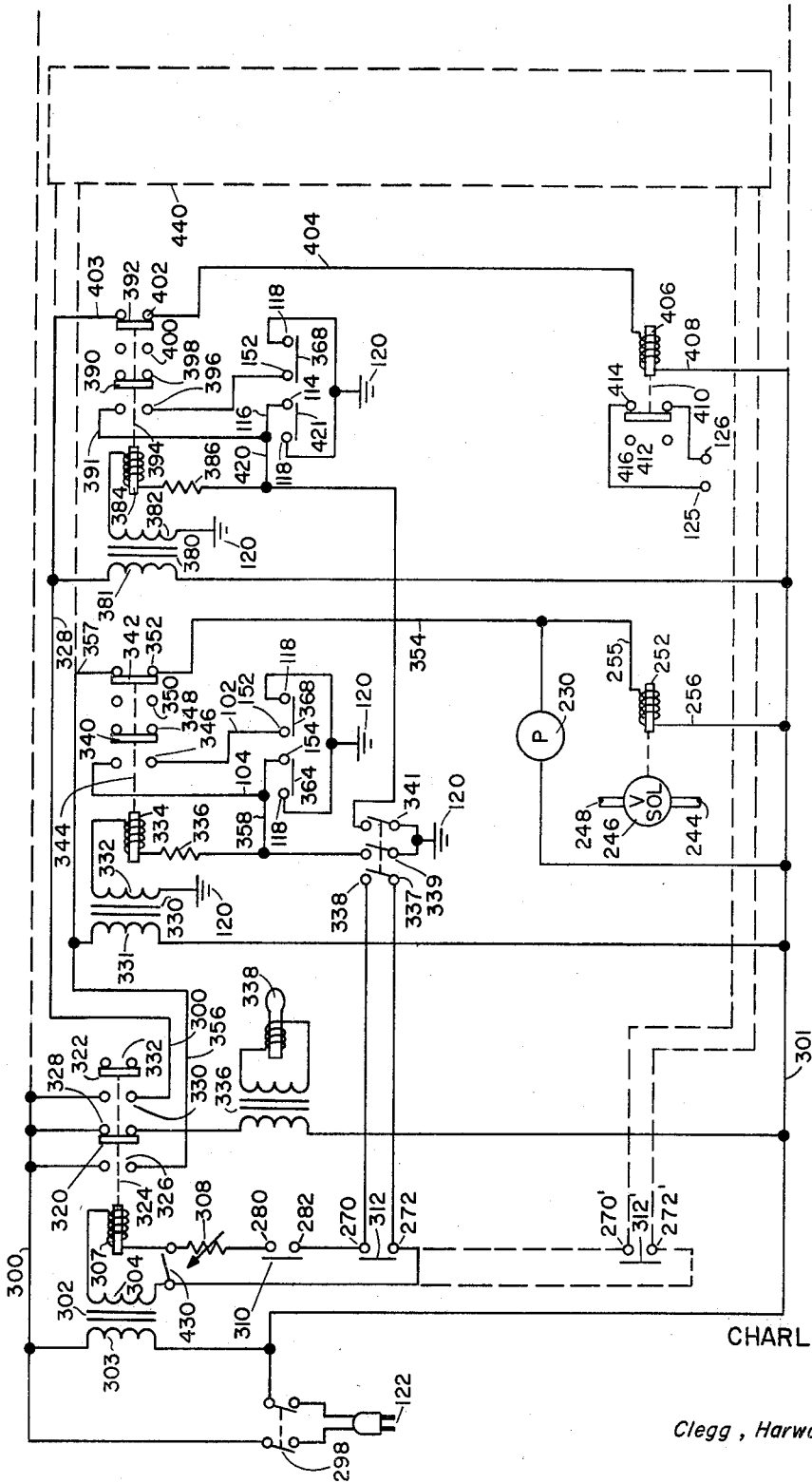
FIGURE 5 is an electrical schematic diagram of the control means for operating the apparatus of FIGURE 1.

Referring to FIGURE 1, the machine comprises a metal outer container 10 enclosing in spaced relation therefrom a cylindrical, metal refrigeration chamber 12, the latter within which beverages are mixed and frozen. Inner container 12 is equipped with a front end plate 14 that is screwed onto the front end thereof, and can be removed so that the inner chamber can be cleaned. The inner chamber also includes an integral backwall 16. An opening 18 is provided in the top of the inner chamber by means of cylindrical wall 20 extending up from the opening to connect to the outer chamber 10, and a conduit 80 of a supply hopper 76 extends through the opening 18 down into the inner chamber for supplying the inner chamber with beverage ingredients.

A generally helical dasher 22 is contained within the inner chamber and is supported by a solid end plate 23 disposed just in front of the opening 18 and an annular ring 24 disposed adjacent the front end of the container. Support rods 25 and 26 are connected between members 23 and 24 to give further strength to the arrangement. The dasher is rotated within the chamber and scrapes the inner walls thereof to continually mix the beverage as it is frozen and to remove any beverage that tends to freeze to the inner walls.

The dasher is rotated by means of a shaft 28 attached to the rear plate 23 and journaled through bearings 30 and 32 contained within the rear wall 16 and rear wall of the outer container 10, respectively. The shaft is connected to a pulley 34 and is driven by means of a belt 38 and another pulley 36 attached to a motor 40 connected to pulley 36 through shaft 42. The motor receives power from any suitable A.C. source by means of connections 44.

An outlet or opening 50 through which the frozen beverage is dispensed is provided in the front plate 14, and connected to the opening is an outlet conduit 52 threaded therein. A dispensing valve 54 is connected to the conduit 52, and beverage is dispensed through the discharge spout 56 connected to the valve by actuating lever 58. Cooling coils 60 are disposed about the inner chamber 12 in thermal contact therewith and are connected by means of refrigerant conduits 62 and 64 at each end thereof to a conventional refrigeration unit 66. The refrigeration unit is of any suitable design, such as that which employs a compressor, cooling coils and condenser coils arrangement, or a gas refrigeration unit, as examples. Refrigerant is forced into conduit 64 and out of conduit 62 to circulate the refrigerant within the refrigeration coils 60.

As mentioned supply hopper 76 includes a conduit 80 that extends through both the inner and outer containers 12 and 10, respectively. The ingredients from which the beverage is comprised is supplied to the inner chamber through the hopper 76 and conduit 80. The hopper 76, in its preferred embodiment, comprises an enlarged cylindrical upper portion 77 having a top cover 78, a tubular extension 80 that extends through the outer container 10 and into the inner chamber 12 and opens through the bottom 82 thereof below the average level 81 of the beverage within the container, and an intermediate section 84 of conical cross section providing a slanted floor connecting extension 80 with upper portion 77. The top or lid 78 is provided to maintain a sanitary condition within the inlet conduit and chamber. A conduit 88 extends through and opens into the hopper 76 through which the combination of syrup, water and carbon dioxide are supplied to the inner chamber 12. An opening 79, shown in FIGURE 2, maintains the interior of the hopper at atmospheric pressure, so that the inner chamber is always maintained at substantially atmospheric pressure through the bottom opening 82 of tube 80. The hopper can be fabricated of any suitable material such as plastic or non-corrosive metal.

As described in the co-pending application referred to above, the ingredients within the inner chamber 12 is maintained at a volume substantially less than the total interior volume of the interior chamber. This volume is represented schematically by the average level 81 of the ingredient within the chamber with an atmosphere 94 comprising primarily carbon dioxide existing above the ingredients. Actually, the ingredients within the chamber are continually agitated by dasher 22, especially in the region from immediately in front of conduit 80 to the front end of the chamber. This agitation causes the ingredients to be maintained in a finely divided state and is continuous on up into the atmosphere 94 to further carbonate the beverage.

Ingredients are supplied to the inner chamber through conduit 88 passing into the hopper 76 and emerge through an opening or port 90 in a pre-mixed, foamy state. Port 90 opens into the atmosphere 94 within the inner chamber, and the ingredients are sprayed out in this atmosphere in the form of a spray or foam 92. In the preferred embodiment of the hopper, the ingredients are passed through a precarbonator and atomizer, shown in FIGURES 2–4, located within the hopper, all as will be explained more fully below.

More than one beverage chamber and hopper are generally included in a commercial machine, and therefore a fragmentary view of another hopper is shown in FIGURE 1 used in conjunction with another refrigeration chamber (not shown). This additional apparatus is shown for illustrative purposes only to show that the control circuit of the apparatus is adapted to handle the operation of a plurality of such beverage dispensing chambers. For duplications of the apparatus, such as the additional hopper shown in the fragmentary view, the parts thereof are indicated with the same numerals having a prime notation thereafter.

The amount of ingredients supplied to the refrigeration chamber is controlled through a control unit 112 operating in conjunction with a control chamber 100 that communicates with the interior of hopper 76. Control chamber 100 will be described in more detail with reference to FIGURE 2 below, but as shown in FIGURE 1, it has a plurality of electrical connections 102, 104, 106, 108 and 110 entering through the top of the chamber which are connected to a plurality of electrical probes or contacts situated within the chamber. The contacts associated with connections 102 and 104 control the level of the ingredients within the chamber and the amount of ingredients supplied thereto in conjunction with the control unit 112, and thus electrical connections 102 and 104 are connected to the control unit 112. The contact associated with electrical connection 102 also controls the starting of the refrigeration unit to refrigerate the inner chamber 12 in conjunction with control unit 112. It is therefore connected to control unit 112 through electrical connection 117. The contacts or probes associated with electrical connections 106, 108 and 110 control, in conjunction with the control unit 112, the stopping of the refrigeration unit 66. These electrical connections are connected to various contacts on a rotary switch 113 so that the selector 114 of the rotary switch can be selectively contacted to any of these electrical connections. The selector of the rotary switch is connected to the control unit 112 through electrical connection 116, and to control the operation of the refrigeration unit 66, the control unit 112 is connected to the refrigeration unit through electrical connections 125 and 126.

All of the probes within the control chamber 100 operate, electrically, with reference to a reference potential, which in this case is ground potential 120, provided by another electrical probe 118 exposed in the bottom interior of hopper 76 as shown in FIGURE 2.

Referring to FIGURE 2, there is shown a side elevational view, in section, of one embodiment of the hopper 76 and control chamber 100 shown schematically in FIGURE 1. Inlet conduit 88 enters the hopper at the top thereof and is connected to a first diffuser 130, to be described in detail later, that atomizes the syrup and water constituents of the beverage. The outlet of this diffuser is connected into a first coil 132 through which the foamed beverage passes, and the outlet of which is connected into another diffuser 134. This diffuser serves the same function as the first diffuser to further atomize and foam the beverage components. This diffuser is connected to another coil 136 through which the beverage components pass, and the outlet of this coil comprises another conduit 138 extending down into tube 80 and is provided with the closed end 142 at the bottom thereof. Conduit 138 is secured to the interior wall of tube 80 and has a port 140 in the side thereof adjacent the bottom that coincides with port 90 in tube 80.

A supply of water, syrup and carbon dioxide in the proper ratios is pumped through conduit 88 into the first diffuser 130. This diffuser foams the mixture and promotes carbonization of the water and syrup with the carbon dioxide. Even though the interior volume of the inner chamber 12 is not completely filled with the frozen beverage, the beverage does rise within the hopper 76 and maintains a certain level therein during the operation of the apparatus. Usually, the beverage is in a partly frozen, partly liquid state, so that diffuser 130 is situated within a refrigerated region which, it is well known, greatly increases the rate of carbonation. As the premixed carbonated ingredients pass through coil 132, they are further refrigerated, to promote further carbonization. These ingredients are passed through the second diffuser 134 to further foam and carbonate the ingredients, are then passed through coil 136 where they are further refrigerated and are finally discharged through coinciding ports 140 and 90 in conduits 138 and 80 respectively. These ingredients are discharged directly into the atmosphere 94 of the inner container 12 in the form of a spray or foam 92 as shown in FIGURE 1, wherein there is a volume of carbon dioxide in the atmosphere 94 above the average level of the mixture within the inner chamber. This carbon dioxide cannot escape into the atmosphere through the hopper 76 except by first penetrating through the level 81 of the mixture and up through the open end 82 of tube 80. This, of course, serves to further carbonate the mixture. Because of the frozen state of the beverage within the inner container and the refrigerated condition of the ingredients within the hopper 76, the ingredients seek a level within the hopper that is proportional to the volume of ingredients contained within the inner chamber.

The control chamber 100 is attached to the exterior of the hopper 76 with a port 148 providing communication between the interiors of the hopper and control chamber. This port is located adjacent the bottom of the control chamber 100 and is intermediate the height along the vertical side of hopper 76. Another port 150, located adjacent the top of control chamber 100, provides additional communication between the interiors of the hopper 76 and control chamber 100 for the purpose of allowing air to pass between the two interiors.

Located within the control chamber 100 are a plurality of electrical probes or contacts 152, 154, 156, 158 and 160 that are connected to the electrical connections 102, 104, 106, 108 and 110 respectively. These probes extend down into the interior of control chamber 100 and terminate within the interior at successively higher levels. For example, probe 152 has an electrical tip disposed at the lowest depth within the chamber, and the other probes or contacts are at successively higher levels. The purposes of the probes are to monitor the level of the ingredients within the control chamber 100, which is also a measure of the level of the ingredients within hopper 76, which is also proportional to the instantaneous level or volume of the ingredients within the inner chamber 12 of the beverage machine. The ingredients pass into the control chamber 100 through port 148, with port 150 being provided to allow air to escape from the interior thereof as the level of the ingredients rises therein. Because the ingredients within the inner chamber 12 are continually agitated by dasher 22, this causes the ingredients within the hopper 76 to also be in a state of agitation, although to a lesser degree. However, the ingredients within control chamber 100 are effectively isolated from the agitation so that a true measure of the level of the ingredients can be made. By monitoring the level of liquid in the inner container 12 the control chamber is then able to regulate the mixture input and the amount of refrigeration as will be seen hereafter.

When the liquid level is between the tips of probes 152 and 154, the control unit 112 maintains the supply of ingredients through conduit 88 shut off. As the frozen beverage is dispensed through outlet spout 56, the level of the ingredients within the inner chamber, hopper 76 and control chamber 100 drops. When the level drops below the tip of probe 152, control unit 112 activates the supply of ingredients through conduit 88 into the hopper 76. At the same time, control unit 112 activates refrigeration unit 66 to start refrigeration of the inner chamber 12 by starting circulation of the refrigerant through the refrigeration coil 60. As the level of the ingredients within the control chamber 100 rises, as a result of additional ingredients being supplied, the control unit 112 will shut off the supply of ingredients only when the ingredients rise to the level of probe 154. In other words, the supply is not stopped as the level attains the height of probe 152 but is stopped only after the level rises an incremental distance above probe 152 to prevent erratic starting and stopping of the supply of ingredients about the level of probe 152. Although the distance between probes 152 and 154 is small, this particular distance corresponds to a substantial volume of ingredients supplied to the inner chamber 12. Moreover, the ingredients, when added, are in the liquid state and are primarily in the liquid state within the control chamber 100. Upon freezing, the mixture expands considerably, thus constituting a considerable volume of ingredients in the frozen state as measured by the distance between probes 152 and 154.

As the newly added ingredients within hopper 76 freeze and expand, the level of the ingredients within the control chamber 100 continues to rise even though the supply of ingredients is shut off. Probes 156, 158 and 160 are connected through connections 106, 108 and 110 respectively, to a rotary switch, the latter of which is connected to the control unit 112 to control the stopping and starting of the refrigeration unit 66. The rotary switch 113 can be selected to connect to any of these three probes, and there can be as many more additional probes at successively different heights within the control chamber as desired. If the main contact 114 of rotary switch 113 is positioned to electrically connect to probe 156, the refrigeration unit will be shut down upon the level of the mixture within the control chamber 100 attaining the height of the tip of probe 156. This probe is the lowest probe within the control chamber at which the refrigeration is stopped, which corresponds to a predetermined frozen condition of the ingredients within the inner chamber 12. This predetermined frozen condition of the ingredients when at the level of probe 156 would correspond when the ingredients are frozen but only to a slushy state, that is, the ingredients being mostly frozen but with some liquid. If the rotary switch is selected to contact probe 158 at a level higher than probe 156, the ingredients will be frozen to a greater degree, and so forth for successively higher probes. Because of the isolation of control chamber 100 from any agitation of the ingredients within the hopper 76, the level of the ingredients is very accurately determined by the probes such that erratic operation of the supply of ingredients to the apparatus and the refrigeration unit is prevented.

Another embodiment of a supply hopper is shown in the side elevational view, partly in section, denoted FIGURE 3. As shown, coils 132 and 136 are eliminated as is one of the carbonators. In this embodiment, the inlet conduit 88 is connected directly into a carbonator 170 the outlet of which is connected to, or forms, a vertical conduit 138 extending down into tube 80 as previously described. Again the carbonator 170 is in a refrigerated atmosphere to promote further carbonization of the ingredients. The control chamber 100 is the same as described with reference to FIGURE 2. It has been found, that, although the two carbonators and two sets of coils of the embodiment shown in FIGURE 2 pre-condition the ingredients before entering inner chamber 12 in a highly foamed and carbonated state, that a single carbonator without any coils is quite sufficient to satisfactorily precondition the ingredients.

Referring now to FIGURE 4, which is a side elevational view, in section, of a diffuser which may be used in conjunction with the machine, the diffuser 130 may be seen to comprise an elongated conduit 180 of any suitable material, such as a plastic or metal pipe, that is filled with small beads or balls 182 comprised of any suitable material, such as plastic or metal that does not contaminate the ingredients of the mixture. Inserted into the two opposite ends of the conduit are screens 184 and 186 through which the mixture comprising the beverage passes. These screens are finely meshed or contain a very large number of small perforations per unit of area so as to break up the components of the mixture as it enters the conduit into a fine mist or foam of finely divided particles. Suitable end caps 188 and 190 are inserted in the ends of the conduit to hold the screens in place, the caps have holes in them through which tubular couplings, 192 and 194 respectively, extend adjacent the screen and through which the ingredients of the mixture are pumped. Conduits 196 and 198 are attached to the couplings 192 and 194 respectively, for connecting the diffuser to the supplying and receiving sources respectively.

The diffuser shown in FIGURE 4 acts to precondition and precarbonate the beverage ingredients by causing the mixture to be foamed and carbonated. Although the diffuser can be of any suitable length, it has been found that the extent of carbonation depends, to some extent, on the length of the diffuser and the temperature of the ingredients as they are passed through it. That is to say, as water, syrup and carbon dioxide in the vapor form are pumped through conduit 196 into the diffuser, these ingredients are broken into a finely particulate foam when passing through stream 184 and are further broken up while maintained in a foamy state when passing through beads 182 and also as they are passed out of the diffuser through screen 186.

It is well known, of course, that carbonization is promoted by the process of atomization. In addition, the extent of the carbonation depends, at least to some extent, on the length of time that the water and syrup ingredients remain in contact with the carbon dioxide gas while in the atomized condition. Since the length of the diffuser is directly proportional to the length of time the ingredients remain in contact in the atomized state it can be seen that increased carbonation may be obtained by increasing the length of the diffuser.

Referring again to FIGURE 1, the rest of the apparatus in schematic form will now be described. In order to illustrate that the control unit 112 is adapted to operate a plurality of beverage dispensing chambers, the components for two such separate operations are shown schematically and are indicated by the same numerical designation for like parts with the prime notation being applied to one of the duplicate sets of components.

A suitable tank 210 for containing syrup of a particular flavor is provided and includes an outlet conduit 212 through which the syrup can be pumped. Another conduit 214, or alternatively an opening, is provided to allow air to enter the tank as the syrup is discharged therefrom. Similarly, another tank 210' is provided for a syrup of a different flavor for a second beverage chamber. Hereafter, reference will not be made to the corresponding parts of the duplicate apparatus that is designated by the prime notations. The outlet conduit 212 of the syrup tank 210 is connected into a pump 230 for withdrawing the syrup from the tank.

A water supply 220 constituting another component of the mixture, is contained within a tank or reservoir 216 and is withdrawn therefrom through outlet conduit 218. Because the ordinances of many cities prohibit the connecting of water into a machine of this nature under conditions where material could back up into the water main should there be a malfunction, the water is supplied through an outlet 222 connected to any suitable water source (not shown) and is discharged into the tank through opening 224. The level of the water is controlled by a float valve 226, all as is well known. The outlet conduit 218 of the water supply is also connected to the pump 230. The operation of the pump is controlled electrically by the control unit 112, and accordingly, electrical connections 233 and 234 connect the control unit with the pump.

The third ingredient of the beverage, carbon dioxide, is contained within a pressurized tank 240, and the carbon dioxide is discharged therefrom under pressure through an outlet conduit 244 through a selectively controlled valve 242. The exact volume flow of the carbon dioxide is regulated by valve 242 for the desired ratio of carbon dioxide with respect to the water and syrup. This conduit is connected into a solenoid valve 246 and the outlet of the valve is connected, at the T-connection 250, into the inlet conduit 88 on the discharge side of pump 230 by means of conduit 248. The valve 246 is controlled through a solenoid 252 associated therewith, and the solenoid is controlled electrically from control unit 112 through electrical connections 255 and 256. Since both the water and carbon dioxide components are common components for any flavor of mixture, only one reservoir of each are required regardless of the number of beverage dispensing chambers in a machine, whereas separate containers of different flavored syrups are required. Accordingly, the water from water reservoir 216 is pumped through both pumps 230 and 230' by means of conduits 218 and 218', respectively. Similarly, carbon dioxide is fed from the single tank 240 to the two inlet conduits 88 and 88' through conduits 244 and 244', respectively and through solenoid valves 246 and 246', respectively. It will be understood that as many additional pumps, solenoid valves and syrup containers will be employed as the number of different flavors of beverage to be dispensed.

The control unit 112 also monitors the supply of water and syrup to shut down the machine automatically should the supply of any of these become exhausted. To do this, spaced apart electrical probes or contacts 270 and 272 extend into the interior of conduit 212 leading from the syrup tank 210 and are connected to the control unit 112 through electrical connections 275 and 276, respectively. So long as the syrup fills the outlet conduit 212, an electrical path will be established between electrical contacts 270 and 272 and the machine will be operative. Should the syrup supply become exhausted, the electrical connection between probes 270 and 272 will be broken, and control unit 112 will then shut down the machine. Similarly, spaced apart electrical probes 280 and 282 extend into the water outlet conduit 218 and are connected to the control unit 112 through electrical connections 285 and 286, respectively, for the same purpose.

An electrical schematic diagram of the control circuit employed in conjunction with the various detector probes is shown in FIGURE 5. The circuit shown provides for only one beverage dispensing chamber, that is, apparatus with provision for only one flavor of syrup. A take off for the auxiliary control circuit to a second machine is shown in phantom denoted as 430.

Electrical power derived from any suitable A.C. source through plug 122 is connected to the control circuit by means of electrical connections 300 and 301 through main switch 298. The control system itself operates on 24 volts A.C., and a stepdown transformer 302 is connected at its primary 303 across the main power source. The secondary 304 of the transformer 302 is connected in series with a solenoid 307 that actuates a multiple pole switch to be described later, and in series with a variable resistor 308.

Also connected in series with this arrangement are switches 310 and 312, which switches correspond to the various parts of electrodes that are employed in the supply lines from the syrup and water tanks. That is to say, electrodes 280 and 282 employed in the water line 218 constitute a switch that is closed when water is contained in the line and is open when the water tank is exhausted. Similarly, electrodes 270 and 272 constitute a switch when closed when syrup is contained in line 212, and open when the syrup supply line is exhausted.

As many additional electrode arrangements can be provided as desired to monitor additional beverage dispensing chambers. To illustrate this, an additional switch 312' with pole 270' and 272' is drawn in phantom as connected in series with the other switches.

Solenoid 307 is operative to actuate a multiple pole switch for certain primary control functions by means of mechanical connection 324. This multiple pole switch comprises a first pair of poles 326 and a second pair of poles 328 between which a switch contact 320 is actuated, and a third pair of poles 330 and a fourth pair of poles 332 between which a second contact 322 is actuated. It will be noted here that when contact 320 closes across poles 238, contact 322 closes across poles 332, and similarly, poles 326 and 330 are closed concurrently. One terminal of each of poles 326, 328 and 330 is connected directly to the high voltage line 300. The primary of another step-down transformer 336 is connected in series with the other terminal of pole 328 and the other high voltage line 301 from the main power source. The secondary of stepdown transformer 336 is connected to a suitable electrical buzzer 338, or other suitable electrical alarm means, so that the bell is actuated to ring when an alternating current flows through the primary of the transformer.

It will be observed that current cannot pass through the secondary 304 of stepdown transformer 302 unless both of the switches 310 and 312 are closed, which is a condition wherein neither the syrup nor water tank is exhausted. It will be seen later that should one of these switches be opened, the entire system is deactuated and the alarm 338 sounds so that the operator knows that one of the supply tanks is exhausted and can replenish it. It will be remarked, however, that the electrical system can be designed so that only that mixing chamber which is supplied from the exhausted syrup tank is deactuated rather than the entire machine.

The primary of another step-down transformer 330 is connected in series between the other terminal of poles 326 and the high voltage line 301, and in similar fashion, the primary of another step-down transformer 380 is connected in series with the other terminal of poles 330 and the high voltage line 301. These two step-down transformers are used to supply voltage to the auiliary control circuit for operating and monitoring the level of the beverage within the control chamber for the one mixing chamber described and for controlling the refrigeration of the mixing chamber. The secondary of transformer 330 is connected at one terminal to ground potential 120 and at the other terminal in series with solenoid 334, resistor 336 and one of the pulses of a triple pole, single throw switch 338, the other terminal of this pair of poles being connected to ground potential 120. When switch 338 is closed, current can flow through the secondary of transformer 330 and through solenoid 334 but only if current flows through the primary of this transformer.

Solenoid 334 actuates a pair of switch contacts between a plurality of switch pole pairs 346, 348, 350 and 352. This switch is similar to the switch previously described and includes switch contact 340 actuated between pole pairs 346 and 348, and switch contact 342 actuated between pole pairs 350 and 352 by means of mechanical connection 344 connected to the solenoid 334. One side of pole pair 346 is connected by means of electrical connection 104 to the lower side of resistor 336 and to the probe 154 within the control chamber 100. It will be seen that liquid in the hopper 76 and control chamber 100 acts as a switch between probe 154 and the ground potential 120 through electrode 118 when the liquid rises to the level of the probe 154. The other side of pole pair 346 is connected by connection 102 to the lowest probe 152 within the control chamber. One side of pole pair 352 is connected by connection 357 to the high voltage line 300 through pole pairs 326 of the main control, and at the other side by means of connection 354 in series with solenoid 254 that actuates valve 246 in the carbon dioxide line and to the other high voltage line 301. Pump motor 230 is connected in parallel with the solenoid 246. The other pole pairs 348 and 350 are dummies.

Referring to FIGURE 1 and to FIGURE 5 together, it will be observed that electrical contact can be established between probe 154 and ground potential 120 through the beverage mixture contained within the control chamber 100 and hopper 76 and the contact 118. This particular connection or conducting path is indicated by numeral 364 in FIGURE 5 as being a switch connection between probe 154 and the ground electrode 118, the latter of which is connected to ground potential 120. Another electrical conducting path can be established between probe 152 and electrode 118, which connection is indicated by numeral 368.

As previously mentioned the primary of step-down transformer 380 is connected in series with the other terminal of pole 330 and with the high voltage line 301. The secondary of transformer 380 is connected at one terminal to the ground potential 120 and at the other terminal in series with the solenoid 384, resistor 386 and one terminal of switch 338 leading to the ground potential 120. When switch 338 is closed and current is flowing through the primary of transformer 380 then current is also able to flow through the secondary thereof to energize solenoid 384.

Solenoid 384 actuates a pair of switch contacts between a plurality of switch pole pairs 396, 398, 400 and 402 similarly to the circuit just described in connection with solenoid 334. This switch includes switch contact 390 actuated between pole pairs 396 and 398 and switch contact 392 actuated between pole pairs 400 and 402 by means of mechanical connection 394 connected to the solenoid. One side of pole pairs 396 is connected by means of electrical connections 397 and 420 to the lower side of the resistor 386 and to the rotary switch 114. As previously mentioned the liquid in the control chamber 100 acts as a switch between the probes contained therein and the ground potential 120 through electrode 118. Rotary switch 114 serves to connect this side of pole 396 to any one of probes 156, 158 or 160 such that the liquid level in the control chamber 100, denoted here as 421, upon making contact with the selected probe completes the circuit between 114 and electrode 118. The other pole of pole pair 396 is connected by electrical connection 117 to the lowermost probe 152 in the control chamber 100. Again a certain level of liquid, denoted 368, serves to close the circuit between the probe 152 and the electrode 118 thus connecting this pole of the pole pair 396 to the ground potential 120. Pole pairs 398 and 400 are dummies.

One side of pole pairs 402 is connected by electrical connection 403 to the high voltage line 300 through the pole pairs 330 of the main control switch. The other pole of pole pairs 402 is connected through electrical connection 404 in series with solenoid 406 and the other high voltage line 301 by electrical connection 408. Solenoid 406 is connected by mechanical connections 410 to a switch contact 412 actuated between pole pairs 414 and 416. Pole pairs 414 are connected at one side to contact 125 and at the other side to contact 126 which, referring to FIGURE 1, are connected to the refrigeration apparatus 66. Thus, completion of the circuit between pole pairs 414 by switch contact 412 serves to complete a circuit between contacts 125 and 126 thus energizing the refrigeration apparatus 66.

Having described the control circuitry contained in control unit 112 the operation of one beverage mixing and dispensing chamber will now be described. It will be assumed that none of the ingredient supply tanks are exhausted so that both switches 310 and 312 are closed. In this event, current passes through solenoid 307 and actuates switch contacts 320 and 322 to close switch pole pairs 326 and 330, respectively. Closing of switch pole pair 326 connects the primary of transformer 330 across the high voltage line, so that current flows through the primary. In order for current to flow through the secondary 332 it must either flow through switch 338 to the ground or find another path. Switch 338 is a manually operated switch whose function will be described later, but which is normally left in the open condition as shown. Thus current cannot normally flow through this switch and another pth must be provided for current to flow through the secondary of transformer 330. It will be assumed that, although there is ample supply in the ingredient tanks, the level of mixture in the control chamber 100 is below probe 152, so that the control circuit will be operative to supply ingredients to raise the level within the mixing and dispensing chamber. With the level of the beverage below probe 152, switch 368 is open, and similarly, switches 364, and 421 are open. With no electrical path provided for current to flow through solenoid 334, switch contacts 340 and 342 remain in their respective positions as shown. Contact 342 closes the circuit between pole pairs 352 and current flows through pump motor 230 to draw water and syrup into the hopper 76. At the same time, current passes through solenoid 252 to actuate valve 246 to add carbon dioxide to the liquid mixture. As the beverage added to the hopper rises to a level to contact probe 152, switch 368 closes to complete an electrical circuit between probe 152 and ground potential 120. However, since pole pairs 346 are open, the closing of this switch at this time has no effect. As the beverages continue to rise to a level that contacts probe 154, switch 364 closes between probe 154 and ground potential 120 through the liquid in the hopper 76. Upon the closing of switch 364, a path is provided for current to pass through solenoid 334, resistor 336 and electrical connection 358 to ground potential 120. The solenoid then actuates switch contact 340 to close pole pairs 346, and switch contact 342 to open pole pairs 352. Switch contact 342 therefore breaks the electrical connection between pole pairs 352 and stops the operation of pump 230 and current from passing through solenoid 252. Thus the supply of syrup, water and gas is cut off and remains in this condition so long as current passes through solenoid 334.

Assuming that beverage is dispensed from the machine to cause the level of the beverage within the control chamber 100 to drop, the control system will not actuate the pump and carbon dioxide solenoid valve when the level drops out of contact with probe 154. The reason for this is that switch contact 368 now closes the circuit between pole pairs 346 to provide an electrical conducting path from ground potential 120 through the secondary of transformer 330, the solenoid 334, resistor 336, electrical connection 358, pole pairs 348 through switch contact 340, through electrical connection 102 and switch 368, which is the beverage conducting path between the lowermost probe 152 and ground potential 120. It is not until the liquid level drops below the level of probe 152 that the supply is again actuated.

Similarly, when switches 310 and 312 are closed and current flows through solenoid 307 contact is made between pole pairs 330 allowing current to flow through the primary 381 of step-down transformer 380. For current to flow through the secondary 382 of transformer 380 it must either flow through switch 338 to the ground or find another path. As mentioned switch 338 is a manually operated switch that normally remains in the open position. Therefore, in order for current to flow through the secondary 382 of transformer 380 it must normally find another path. When liquid in the control chamber 100 is below the level of the lowest probe 152 neither of the switches 368 or 421 are closed and therefore no current can flow through the secondary 382 of transformer 380 to actuate the solenoid 384 and in this condition switches 390 and 392 are in the positions shown in FIGURE 5 with switch 390 closing dummy poles 398 and switch 392 closing the circuit between pole pairs 402.

With the circuit between pole pairs 402 closed current can then flow through electrical connection 404 to solenoid 406 causing the switch contact 412 to close the circuit between pole pairs 414 providing a completed circuit between contacts 125 and 126 to operate the refrigeration apparatus 66. As previously mentioned since the liquid level in the control chamber 100 is below the level of probe 152 the motor 230 and solenoid 246 are operative to provide syrup water and gas to the supply hopper 76. This mixture being added to the chamber along with the expansion due to refrigeration causes the liquid level in the control chamber 100 to rise. As the level rises to a level to contact probe 152, switch 368 is closed to complete the circuit between probe 152 and the ground potential 120. However, since pole pairs 396 are open, the closing of this switch at this time has no effect. As the beverages continue to rise to a level that contacts whichever of probes 156, 158, or 160 that rotary switch 114 is connected to, switch 421 is closed between that probe and ground potential 120 through the liquid in the chamber.

Upon closing of the switch 421, a path is provided for a current to pass through solenoid 384, resistor 386, electrical connections 420, 116 and 118 to the ground potential 120. This causes the solenoid 384 to actuate switch contact 390 to close pole pairs 396 and switch contact 392 is actuated to open pole pairs 402. Upon opening of pole pairs 402, current stops flowing through solenoid 406 and switch contact 412 moves against poles 416 opening the circuit between pole pairs 414 and shutting off the refrigeration apparatus.

It will now be seen that the refrigeration apparatus stays in the off position until the liquid level drops back down below the lowermost probe 152. When switch contact 390 closes poles 396, a circuit is completed through the secondary 382 of transformer 380, solenoid 384, resistor 386, and electrical connections 420 and 397 and 117 to the ground potential 120. As the liquid level in the control chamber 100 drops below the level of the probe selected by rotary switch 114, the connection between the probe and ground potential 120, denoted as switch 421, is opened. However, opening switch 421 at this time has no effect as the electrical path through pole pairs 396 is still closed. It is not until the liquid level drops below the level of probe 152 and switch 368 is opened that the circuit through solenoid 384 is completely broken and switches 390 and 392 move back to the positions as shown with switch contact 392 closing pole pairs 402 and again activating the refrigeration apparatus.

Should either the water or syrup supply tank become exhausted, either switch 310 or 312 will be opened, thus removing power from the transformer 302 and the remainder of the control circuit for the beverage dispensing machine. When this happens, the circuit through the solenoid 307 is opened and current cannot flow. The switch contacts 320 and 322 then move to the positions as shown in FIGURE 5 with the contacts 320 opening pole pairs 326 and closing pole pairs 328 and the contact 322 opening pole pairs 330 and closing pole pairs 332. Upon opening of pole pairs 326, the circuit through the primary 331 of transformer 330 is broken, thus turning off the liquid supply motor 230 and the gas supply solenoid 246. Similarly when pole pairs 330 are opened, the circuit through the primary 381 of transformer 380 is broken thus cutting off power to the refrigeration apparatus 66. Closing of poles 332 by switch contact 322 has no effect as they are dummies. However, closing of poles 328 by switch contacts 320 completes the circuit from high voltage line 300 through the primary of transformer 336 and to the other high voltage line 301. Current through this transformer 336 causes the bell or other alarm means 338 to sound to alert the operator to the fact that one of the supply tanks is empty.

In order to prime the system long enough to close either the switches 310 or 312 after refilling the respective tanks a single pole single throw switch 430 is connected directly between one terminal of primary 304 and the solenoid 307 to shunt out switches 310 and 312. This switch is manually held in a closed position to re-establish power to the pump 230 until it has been operated long enough to prime the supply line enclosing the respective switch. Thereafter, the switch 430 is opened, and the system is again automatic.

The system as just described had reference to a single dispensing chamber, but as already mentioned, as many chambers can be operated simultaneously as desired. In the event an exhausted syrup supply tank for one dispensing chamber cannot be replenished, it may be desirable to maintain operation of the other dispensing chambers. To effect this, each auxiliary control circuit, the circuit for operating one dispensing chamber, is provided with a circuit to effectively disconnect it from the main control circuit. Thus, switch 338 is provided, which is a triple pole single throw switch. Upon manually closing switch 338, contact is made between poles 337 to shunt switch 312 which is responsive to the syrup flow. At the same time, closing of switch 338 provides a complete circuit for current to be conducted through solenoids 334 and 384. The effect of this is to open pole pairs 352 that operate the motor 230 and solenoid 246 and pole pairs 402 that operate the refrigeration apparatus 66.

As shown schematically in phantom by the numeral 440, as many other dispensing chambers are attendant auxiliary control circuits as may be desired can be employed in connection with the primary control circuit. In this case, the auxiliary control circuits are identical with the circuit just described with the main power connections for the transformers being connected in parallel with the primary 331 and 381 of transformers 330 and 380 respectively and the syrup cut-off switch, denoted here as 312', between contacts 270' and 272' being connected in series with switches 310 and 312.

The invention has been described so far with reference to what is generally referred to as post-mix system where the water, syrup and carbon dioxide are mixed in the machine upon its being actuated to supply the ingredients to the hopper of the beverage freezing and dispensing chamber. The system of this invention, however, is also equally adapted to what is generally referred to as pre-mix operation whereby water, syrup, and carbon dioxide in proper proportions are previously mixed and placed in suitable containers. Such pre-mix containers of beverage are well known in the industry and are widely employed in beverage dispensing machines that do not freeze the beverage. Moreover, as the hopper of this invention is well suited for carbonating the beverage, the machine is adapted for using pre-mix containers of only syrup and water and continuing to carbonate the mixture in the machine as described.

While the machine of the present invention has been described with reference to a particular embodiment, it is also to be understood that modifications and substitutions that do not depart from the true scope and content of the invention will undoubtedly occur to those skilled in the art. Therefore, it is intended that the invention be limited only as defined in the appended claims.

What is claimed is:
1. Apparatus for freezing and dispensing a carbonated soft drink type beverage comprising:

(a) a first chamber, including agitation means within which said beverage is frozen, having an outlet through which said beverage is dispensed in the frozen state;
(b) refrigeration means associated with said first chamber for freezing said beverage;
(c) a vertically disposed hopper communicating with said first chamber through which ingredients comprising said beverage are supplied to said first chamber;
(d) supply means for supplying ingredients in the liquid state to said first chamber;
(e) a second chamber, communicating with said hopper within which said ingredients seek a level proportional to the amount of ingredients in said first chamber and are effectively isolated from agitation associated with ingredients in said hopper, and,
(f) control means for actuating said supply means to supply ingredients to said first chamber when said ingredients within said second chamber drop below a first predetermined level and for deactuating said supply means when said ingredients within said second chamber rise to a second predetermined level above said first predetermined level.

2. Apparatus as set forth in claim 1 wherein said control means comprises first and second vertically spaced apart electrode probes disposed in said second chamber for contacting said ingredients.

3. Apparatus as set forth in claim 2 also including electrical means connected to said apparatus for establishing said ingredients at a reference potential, said control means being effective to actuate said supply means when an electrical path through said ingredients between said electrical means and the lower of said first and said second electrode probes is broken and to deactuate said supply means when an electrical path is established through said ingredients between said electrical means and the higher of said first and said second electrodes.

4. Apparatus as set forth in claim 1 also including control means for actuating said refrigeration means when said ingredients within said second chamber drop below said first predetermined level and for deactuating said refrigeration means when said ingredients within said second chamber rise to a fourth predetermined level above said first predetermined level.

5. Apparatus set forth in claim 3 also including a third electrode probe disposed in said second chamber and control means responsive to an electrical current through said third electrode probe for deactuating said refrigeration means when an electrical path is established through said ingredients between said electrical means and said third probe and wherein means are also included for actuating said refrigeration means when the ingredients within said second chamber drop below said first predetermined level.

6. Apparatus as set forth in claim 3 also including a plurality of vertically spaced apart electrode probes disposed in said second chamber and control means selectively responsive to an electrical current through one of said plurality of electrode probes for deactuating said refrigeration means when an electrical path is established through said ingredients between said electrical means and said selected electrode probe and wherein means are also included for actuating said refrigeration means when the ingredients within said second chamber drop below said first predetermined level.

7. Apparatus as set forth in claim 6 wherein said latter described means comprises one of said first and said second vertically spaced apart electrode probes.

8. Apparatus as set forth in claim 1 further including means disposed in said first chamber for agitating said ingredients.

9. Apparatus as set forth in claim 1 further including means for agitating said ingredients and for urging said ingredients toward said outlet.

10. Apparatus for dispensing a frozen carbonated beverage comprising:
(a) a first chamber, including agitation means within which said beverage is frozen, having a closeable outlet through which said beverage can be dispensed in the frozen state;
(b) refrigeration means associated with said first chamber for freezing said beverage;
(c) a vertically disposed hopper having a bottom opening in the lower end thereof communicating with said first chamber at a position disposed below a lowest average level of ingredients within said first chamber, said first chamber being closed above the level of said bottom opening;
(d) a conduit for connecting supply means to said first chamber for supplying a mixture of gas and liquid ingredients to said first chamber;
(e) a second chamber, communicating with said hopper, within which said ingredients seek a level proportional to the amount of ingredients in said first chamber and are effectively isolated from any agitation associated with ingredients in said hopper; and
(f) control means for actuating said supply means to supply ingredients to said first chamber when the level of said ingredients, within said second chamber, drops below a first predetermined level and for deactuating said supply means when said ingredients within said second chamber rise to a second predetermined level above said first predetermined level.

11. Apparatus as defined in claim 10 wherein said conduit opens into said first chamber into the closed space above the level of said bottom opening.

12. Apparatus as defined in claim 10 wherein said hopper further includes an opening to the atmosphere.

13. Apparatus as set forth in claim 10 wherein said control means comprises first and second vertically spaced apart electrode probes disposed in said second chamber for contacting said ingredients.

14. Apparatus as set forth in claim 13 further including electrical means connected to said apparatus for establishing said ingredients at a reference potential, said control means being effective to actuate said supply means when an electrical path through said ingredients, between said electrical means and the lower of said first and second electrode probes, is broken and to deactuate said supply means when an electrical path is established through said ingredients between said electrical means and the higher of said first and said second electrodes.

15. Apparatus as set forth in claim 10 further including control means for actuating said refrigeration means when said ingredients within said second chamber drop below said first predetermined level and for deactuating said refrigeration means when said ingredients within said second chamber rise to a fourth predetermined level above said first predetermined level.

16. Apparatus as set forth in claim 14 further including a third electrode probe disposed in said second chamber and control means responsive to an electrical path established between said electrical means and said third electrode probe for deactuating said refrigeration means and wherein means are also included for actuating said refrigeration means when the ingredients within said second chamber drop below said first predetermined level.

17. Apparatus as set forth in claim 14 further including a plurality of vertically spaced apart electrode probes disposed in said second chamber and control means selectively responsive to an electrical current through one of said plurality of electrode probes for deactuating said refrigeration means when an electrical path is established through said ingredients between said electrical means and said selected electrode probe and wherein means are also included for actuating said refrigeration means within the ingredients within said second chamber drop below said first predetermined level.

18. Apparatus as set forth in claim 17 wherein said latter described means comprises one of said first and said second vertically spaced apart electrode probes.

19. Apparatus as set forth in claim 10 wherein a part of said conduit passes through said hopper and further including diffuser means disposed in said part of said conduit whereby ingredients in said hopper promote cooling of said mixture supplied through said conduit and diffuser means, aiding said diffuser means in causing the dissolution of said gas into said liquid ingredients.

20. Material handling apparatus, comprising:
(a) a first chamber having refrigeration means associated therewith, said first chamber including agitation means,
(b) supply means for supplying ingredients in a fluid state to said first chamber,
(c) hopper means in communication with said first chamber providing an overflow container for said first chamber,
(d) control chamber means communicating with said hopper means for effectively isolating ingredients within said control chamber from agitation associated with ingredients in said hopper means, said ingredients within said control chamber seeking a level proportional to the level of ingredients within said first chamber, and
(e) control means for actuating said supply means when the ingredients within said control chamber drop below a predetermined level and for deactuating said supply means when the ingredients within said control chamber rises above a predetermined level.

21. The apparatus as described in claim 20 wherein said control means also deactuates said refrigeration means when said ingredients within said control chamber rises above another predetermined level.

References Cited

UNITED STATES PATENTS

| | | | |
|---|---|---|---|
| 3,044,878 | 7/1962 | Knedlik | 62—306 X |
| 3,068,660 | 12/1962 | Council et al. | 62—352 X |
| 3,359,748 | 12/1967 | Booth | 62—342 X |
| 3,365,903 | 1/1968 | Lutz et al. | 62—177 |

WILLIAM E. WAYNER, Primary Examiner

U.S. Cl. X.R.

62—69, 180; 137—392